United States Patent
Fang

(10) Patent No.: US 7,927,463 B2
(45) Date of Patent: Apr. 19, 2011

(54) TRITIUM DISTILLATION DEVICE

(75) Inventor: Hsin-Fa Fang, Taoyuan County (TW)

(73) Assignee: Institute of Nuclear Energy Research, Longtan, Taoyuan (TW)

( * ) Notice: Subject to any disclaimer, the term of this patent is extended or adjusted under 35 U.S.C. 154(b) by 858 days.

(21) Appl. No.: 11/848,273

(22) Filed: Aug. 31, 2007

(65) Prior Publication Data

US 2009/0057127 A1    Mar. 5, 2009

(51) Int. Cl.
*B01D 3/02* (2006.01)
*C02F 1/04* (2006.01)
*F28D 1/06* (2006.01)
*F28F 21/00* (2006.01)

(52) U.S. Cl. .......... 202/163; 159/DIG. 15; 165/151; 165/180; 165/182; 202/182; 202/185.3; 202/189; 202/267.1; 203/10; 203/86; 203/100; 237/7

(58) Field of Classification Search ........... 159/DIG. 15; 165/151, 180, 182, 913; 202/163, 182, 185.3, 202/189, 206, 267.1; 203/10, 86, 100; 237/7
See application file for complete search history.

(56) References Cited

U.S. PATENT DOCUMENTS

| | | | | |
|---|---|---|---|---|
| 2,882,449 A * | 4/1959 | Beurtheret | .................... | 315/118 |
| 3,703,592 A * | 11/1972 | Kassat et al. | ............... | 202/185.5 |
| 6,280,577 B1 * | 8/2001 | Wang | ........................ | 202/185.3 |
| 6,341,645 B1 * | 1/2002 | Tanaka et al. | ............ | 165/104.33 |
| 6,432,174 B1 * | 8/2002 | Heung | ............................ | 95/289 |
| 6,439,298 B1 * | 8/2002 | Li | ............................. | 165/104.33 |
| 7,470,350 B2 * | 12/2008 | Bonnett et al. | .................... | 203/5 |
| 7,487,643 B2 * | 2/2009 | Chen et al. | .......................... | 62/6 |
| 2005/0120715 A1 * | 6/2005 | Labrador | ........................ | 60/618 |

* cited by examiner

*Primary Examiner* — Virginia Manoharan

(57) ABSTRACT

The present invention provides a novel tritium distillation device, which includes a container, a radiator covered on top of the container with a protrusion at the bottom, a conduit penetrating the container with an inlet and an outlet, the inlet being arranged in correspondence with the protrusion, and a heating device fixed below the container. The method of operating the tritiated water distillation includes the steps of adding environmental tritiated water in the container, covering the radiator on top of the container closely, heating environmental tritiated water to cause tritiated water steam to be condensed to the bottom of the radiator, and collecting the tritiated water condensation dropped from the protrusion with conduit. The present invention uses a simple structure to ease assembly and reduce the cost of cooling water source.

16 Claims, 5 Drawing Sheets

TRITIUM DISTILLATION DEVICE

BACKGROUND OF THE INVENTION

1. Field of the Invention

The present invention is related to a distillation device especially to a tritium distillation device, and it is applicable to purify environmental tritiated water and measure the content of tritiated water in the environment.

2. Prior Art

The sources of tritium in environment are produced mainly from cosmic rays, nuclear bomb test, and nuclear reactor during operation. The analysis of the tritium in environmental water nearby nuclear facility is one of important surveillance objects. In traditional analysis method of tritium in water, it heats up the environmental water in a distillation flask to produce vapor and cools it to liquid tritiated water through condensation tube and then collects that liquid tritiated water for analyzing the content of tritium. However, the traditional distillation device is far more complicated due to that the condensation tube needs large quantity of water for cooling, thus the consumption of water resource will be increased. Yet the traditional distillation device used unstable heat source alcohol lamp, the distillation rate and quality can not be properly controlled when there comes a breeze the alcohol lamp will be blow out. To solve the problems of the traditional tritium distillation device, the main function of a tritium distillation device should include sample heating, vapor condensation, and sample collection. For avoiding over heating, a thermometer maybe provided to monitor temperature. And the heating plate can be changed according to the heating method adopted. The shape of container has been altered from round bottom flask to flat bottom container for safer placement, and the flask mouth is enlarged for easily adding sample and cleaning afterwards to reduce pollution. In the part of vapor cooling, the glass condenser tube has been changed from a water-cooled type to an air-cooled type having plurality of metal blade to strengthen the effect of heat sink. The bottom of the metal radiator was formed in taper shape thus the condensed vapor can be concentrated at the cusp of the taper shape and drips in the collecting tube of the container. There is a cylindrical cavity on the metal radiator to add water in to avoid overheating. The simplified assembly requires only two parts (excluding sample collecting bottle or flask), however, the traditional method requires four parts or more. Since the cleaning problem can be resolved with the present invention, the pollution is avoided and the analysis quality is thus improved. The tritium distillation device of the present invention not only overcome the flaws of traditional tritium distillation device, such as large quantity of water consumed by an air-cooled glass tube condenser and unstable heat source with alcohol lamp, but also provide advantages of quick assembly and improve the quality of analysis with easiness of cleaning.

SUMMARY OF THE INVENTION

One object of the present invention is to provide a tritium distillation device with a simple structure to ease assembly.

Another object of the invention is to provide a circular slot around the bottom of the radiator and furnished with a heat insulating elastic cushion to prevent sliding and avoid vapor leaking, and prevent the heat of the container from conducting to the radiator to maintain the efficiency of radiation.

The other object of the invention is to provide a tritium distillation device, which uses a heating plate in distillation and offers a more stable heat source than traditional alcohol lamp. Therefore, the time of distillation is easy to be controlled and the workable amount of distillation is increased.

The present invention provides a tritium distillation device comprising a container, a radiator equipped on the top of container with a protrusion at the bottom of it, a conduit penetrating the container with an inlet and an outlet, the inlet being arranged in correspondence with the protrusion, and a heating device fixed below the container. The steps of operating the tritium distillation device comprising adding the environmental tritiated water in the container, covering the radiator up on the container closely, heating environmental tritiated water to cause the tritiated water vapor condensation gathered at the bottom of the radiator, and collecting the tritiated water condensation dropped from the protrusion with conduit; and there is a hollow cylindrical cavity furnished on the metal radiator for containing water for indication of when the radiator being overheated.

The present invention will be apparent to those skilled in the art by reading the following description of a preferred embodiment thereof, with reference to the accompanying drawings.

DETAILED DESCRIPTION OF THE PREFERRED EMBODIMENT

Figure 1:
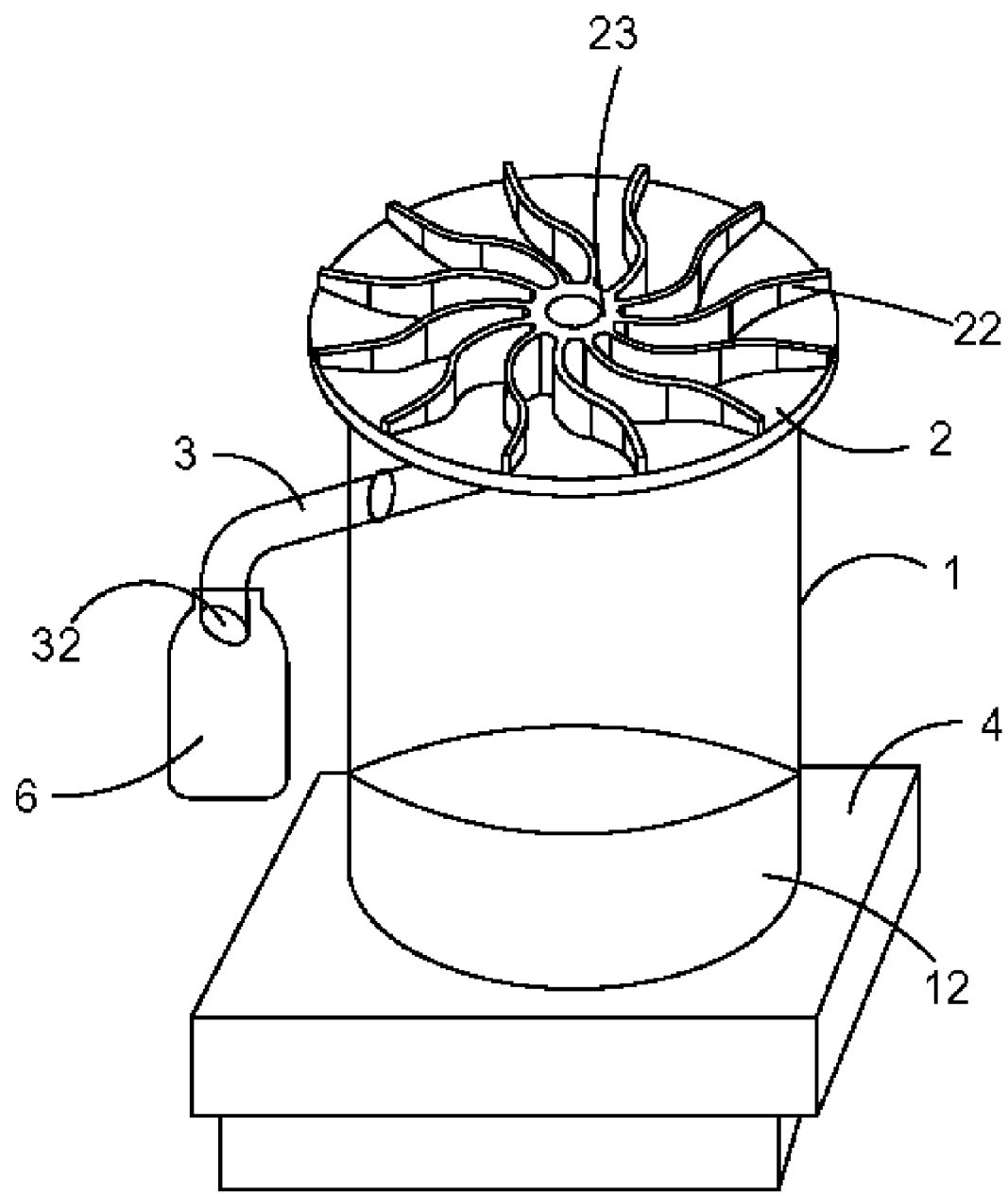
FIG. 1 is a plan view of a tritium distillation device of the present invention.
Figure 2:
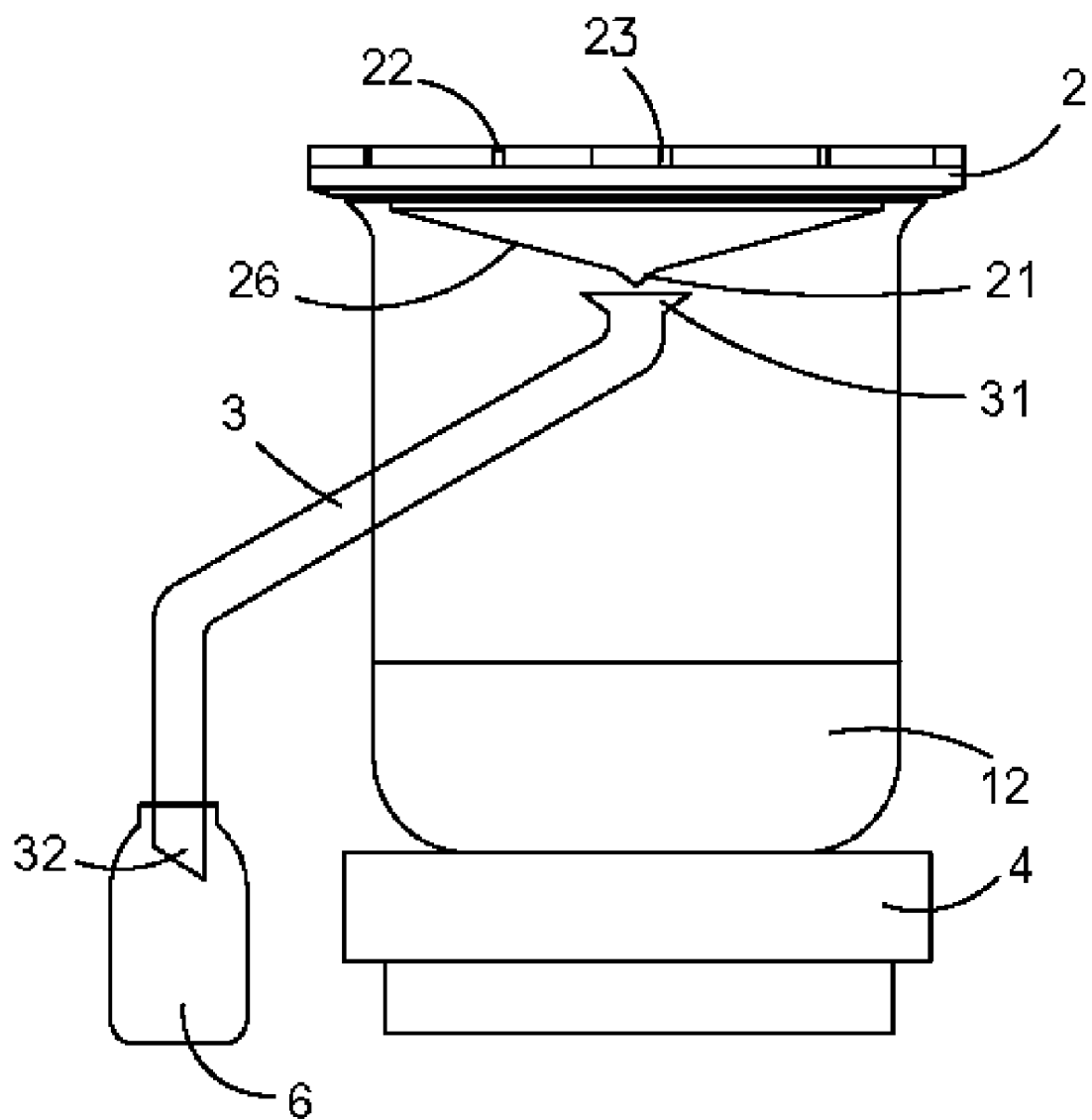
FIG. 2 is a side view of the tritium distillation device of the present invention.

With reference to FIG. 1 and FIG. 2, wherein a tritium distillation device of the present invention is shown, including a container 1, a radiator 2 fixed up on the container 1 with a protrusion at the bottom, a conduit 3 penetrating the container 1 with an inlet 31 and an outlet 32, the inlet 31 being arranged in correspondence with the protrusion 21, and a heating device 4 fixed below the container 1.

The container 1 herein is a cylinder made of the material of glass; the radiator 2 is a disc type with a cylindrical cavity 23 furnished at center of the radiator 2 with at least one heat sink blade 22, and the cylindrical cavity 23 linking to the heat sink blade 22 is a hollow cylindrical cavity to contain water for a simple overheating indication. The water in the cylindrical cavity 23 will evaporate only a small amount during normal operation, while in an overheating situation, the water will evaporate much quicker. The heat sink blade 22 is designed in an S curve shape to maximize its heat sink area. The radiator 2 has a taper bottom 26 with a protrusion 21 furnished at center as a cusp; a collecting bottle 6 arranged in correspondence with the outlet 32 is used to collect the distilled environmental tritiated water; the heating device 4 is a heating plate or a heating pack.

Figure 3:
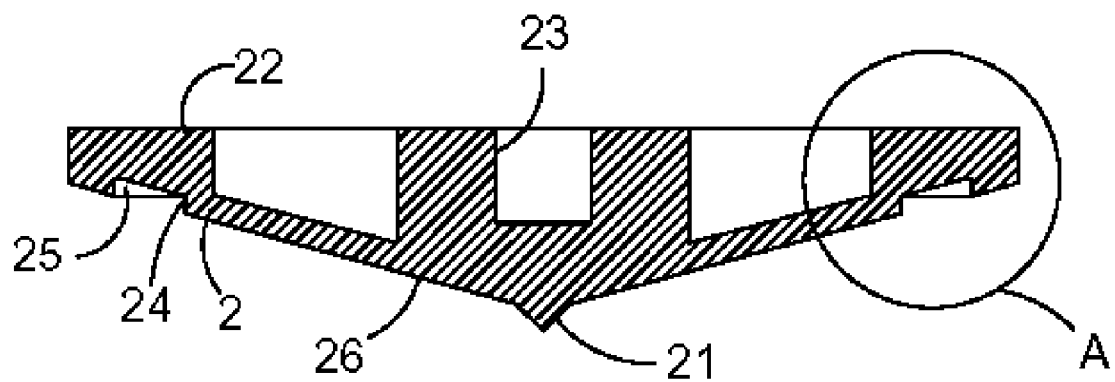
FIG. 3 is a explode view of a radiator of the tritium distillation device of the present invention.
Figure 3A:
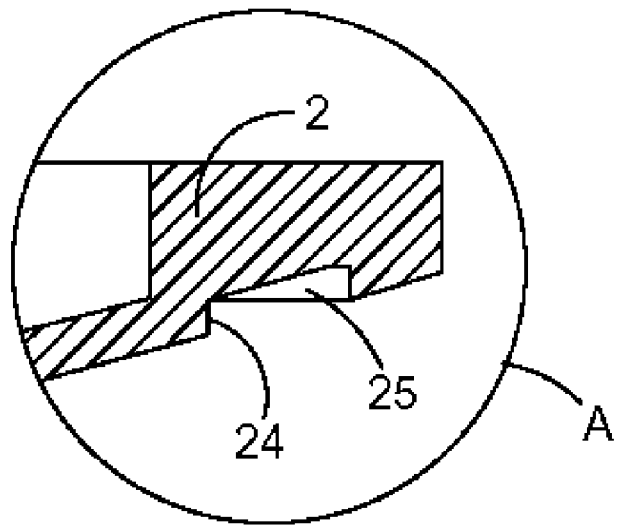
FIG. 3A is an enlarged view of portion A shown in FIG. 3.

Referring to FIG. 3 and FIG. 3A, the circular slot 24 is provided around the bottom 26 of the radiator 2 and furnished with a heat insulating elastic cushion made of rubber. The heat insulating elastic cushion 25 is a skid proof airtight type cushion for mating together the radiator 2 and the container 1 tightly to prevent sliding and avoid vapor leaking and also prevent the heat of the container 1 from conducting to the radiator 2 to maintain the efficiency of radiation. The radiator can be made of metal or glass and the metal is preferable.

Figure 4:
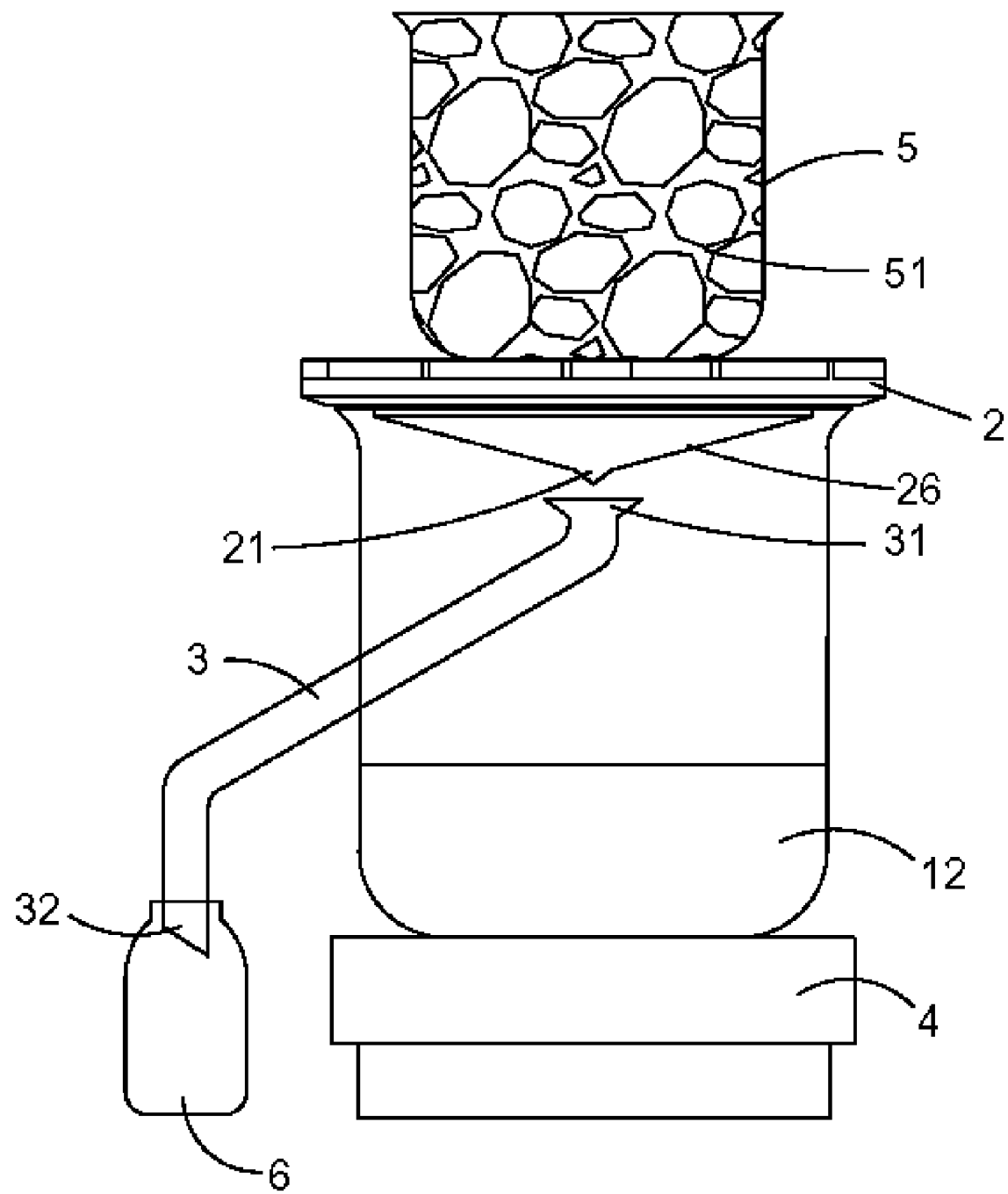
FIG. 4 is a side view of another embodiment of the present invention.

Referring to FIG. 4, a cooling liquid container 5 filled with ice 51 maybe placed on the top of the radiator 2 to accelerate the condensation of tritiated water vapor.

Referring to FIG. 4, the present invention tritium distillation device is used to evaporate the tritiated water contained in the environmental tritium 12 and condense at the bottom of the radiator 2, and the condensed tritiated water is collected from the protrusion 21 by gravity to drip in the conduit 3 and being collected in collecting bottle 6.

Figure 5:
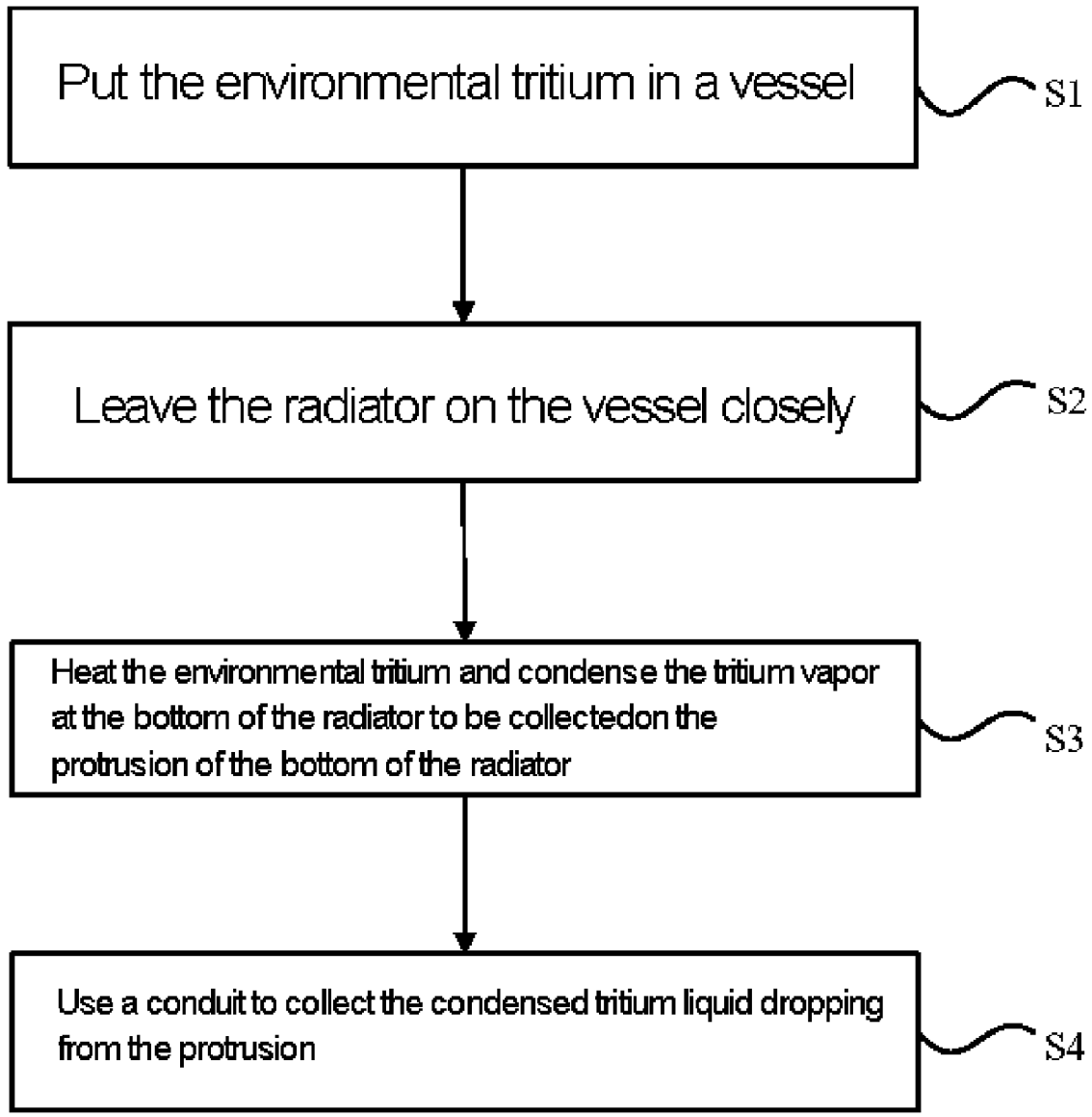
FIG. 5 is a flow chart showing steps of operating the tritium distillation device of the present invention.

The steps of operating the tritium distillation device of the present invention referring to FIG. 5 include:

Step 1. Put the environmental tritiated water in a container;
Step 2. Cover the radiator on the container closely;
Step 3. Heat the environmental tritiated water and condense tritiated water vapor at the bottom of the radiator to be collected on the protrusion of the bottom of the radiator;
Step 4. Use a conduit to collect the condensed tritiated water liquid dripping from the protrusion.

And there is another step of filtering the environmental tritiated water before the step 1.

And there is another step of filtering the environmental tritium before the step 1.

For the foregoing description, the present invention tritium distillation has a simple structure for easily assembling, no condenser tube required, and the cost of cooling water source would be reduced. The heat source for distillation using a heating plate or pack is more stable than traditional alcohol lamp, and the distillation time is better controlled.

One skilled in the art can easily ascertain the essential characteristics of this invention, and without departing from the spirit and scope thereof, can make various changes and modifications of the invention to adapt it to various usages and conditions.

What is claimed is:

1. A tritium distillation device comprising:
   a container containing tritiated water for distillation;
   a radiator having at least one heat sink blade and covering on the container with a protrusion at the bottom for condensing vapor of tritiated water, wherein a cylindrical cavity is furnished at center of the radiator containing water for overheating indication;
   a conduit penetrating the container with an inlet and an outlet, and the inlet arranged in correspondence with the protrusion, and
   a heating device installed below the container for boiling tritiated water;
   wherein a circular slot is provided around the bottom of the radiator, and furnished with a heat insulating elastic cushion inside.

2. A tritium distillation device according to claim 1, wherein the container is a cylindrical shape.

3. A tritium distillation device according to claim 1, wherein the container is made of glass.

4. A tritium distillation device according to claim 1, wherein the radiator is a disc radiator with at least one heat sink blade.

5. A tritium distillation device according to claim 4, wherein the radiator has a hollow cylindrical cavity at center linked to the heat sink blade.

6. A tritium distillation device according to claim 4, wherein the heat sink blade is a curved heat sink blade.

7. A tritium distillation device according to claim 1, wherein the heat insulating elastic cushion is made of rubber.

8. A tritium distillation device according to claim 1, wherein the heat insulating elastic cushion is a skid proof airtight cushion.

9. A tritium distillation device according to claim 1, wherein the radiator is made of metal or glass.

10. A tritium distillation device according to claim 9, wherein the preferable material is metal.

11. A tritium distillation device according to claim 1, further including a condensed liquid container placed on top of the radiator.

12. A tritium distillation device according to claim 11, wherein the condensed liquid in the container is ice water.

13. A tritium distillation device according to claim 1, wherein the bottom of the radiator is a taper bottom.

14. A tritium distillation device according to claim 1, wherein a collecting bottle is arranged in correspondence with the outlet.

15. A tritium distillation device according to claim 1, wherein the heating device is a heating plate or a heating pack.

16. A tritium distillation device according to claim 1, wherein the radiator is hermetically in contact with the container.

* * * * *